United States Patent
Generale et al.

(10) Patent No.: US 11,092,015 B2
(45) Date of Patent: Aug. 17, 2021

(54) AIRFOIL WITH METALLIC SHIELD

(71) Applicant: United Technologies Corporation, Farmington, CT (US)

(72) Inventors: Adam P. Generale, Dobbs Ferry, NY (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 31 days.

(21) Appl. No.: 16/562,557

(22) Filed: Sep. 6, 2019

(65) Prior Publication Data
US 2021/0071534 A1 Mar. 11, 2021

(51) Int. Cl.
*F01D 5/18* (2006.01)
*F01D 5/14* (2006.01)

(52) U.S. Cl.
CPC .............. *F01D 5/147* (2013.01); *F01D 5/189* (2013.01); *F05D 2220/32* (2013.01)

(58) Field of Classification Search
CPC . F01D 5/147; F01D 5/20; F01D 5/225; F05D 2220/32
See application file for complete search history.

(56) References Cited

U.S. PATENT DOCUMENTS

| 6,514,046 B1 | 2/2003 | Morrison et al. |
| 2016/0312630 A1* | 10/2016 | Davis, III ............... F01D 9/065 |
| 2017/0254206 A1* | 9/2017 | Schetzel ................. F01D 5/147 |
| 2019/0153879 A1 | 5/2019 | Vetters et al. |

FOREIGN PATENT DOCUMENTS

| EP | 2907974 | 8/2015 |
| EP | 2975217 | 1/2016 |

OTHER PUBLICATIONS

European Search Report for European Patent Application No. 20190982.7 completed Nov. 25, 2020.

* cited by examiner

*Primary Examiner* — Gonzalo Laguarda
(74) *Attorney, Agent, or Firm* — Carlson, Gaskey & Olds, P.C.

(57) ABSTRACT

A gas turbine engine airfoil includes an airfoil section that has an airfoil wall and a rib that are formed of a ceramic matrix composite. The airfoil wall circumscribes an internal cavity for receiving cooling air. The airfoil wall defines leading and trailing ends and first and second sides that join the leading and trailing ends. The rib connects the first and second sides. A metallic shield is disposed in the internal cavity and at least partially encloses the rib to shield the rib from the cooling air.

19 Claims, 8 Drawing Sheets

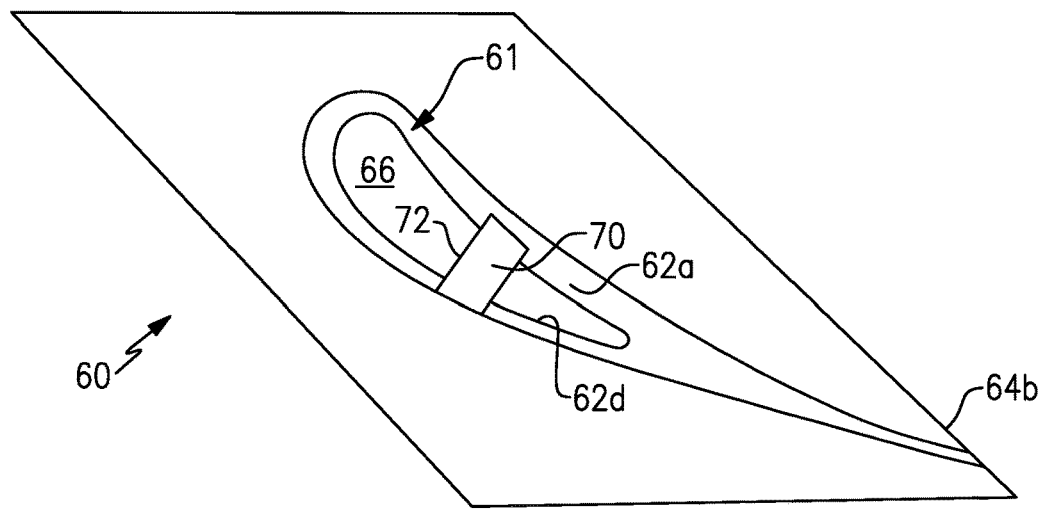
FIG.2B
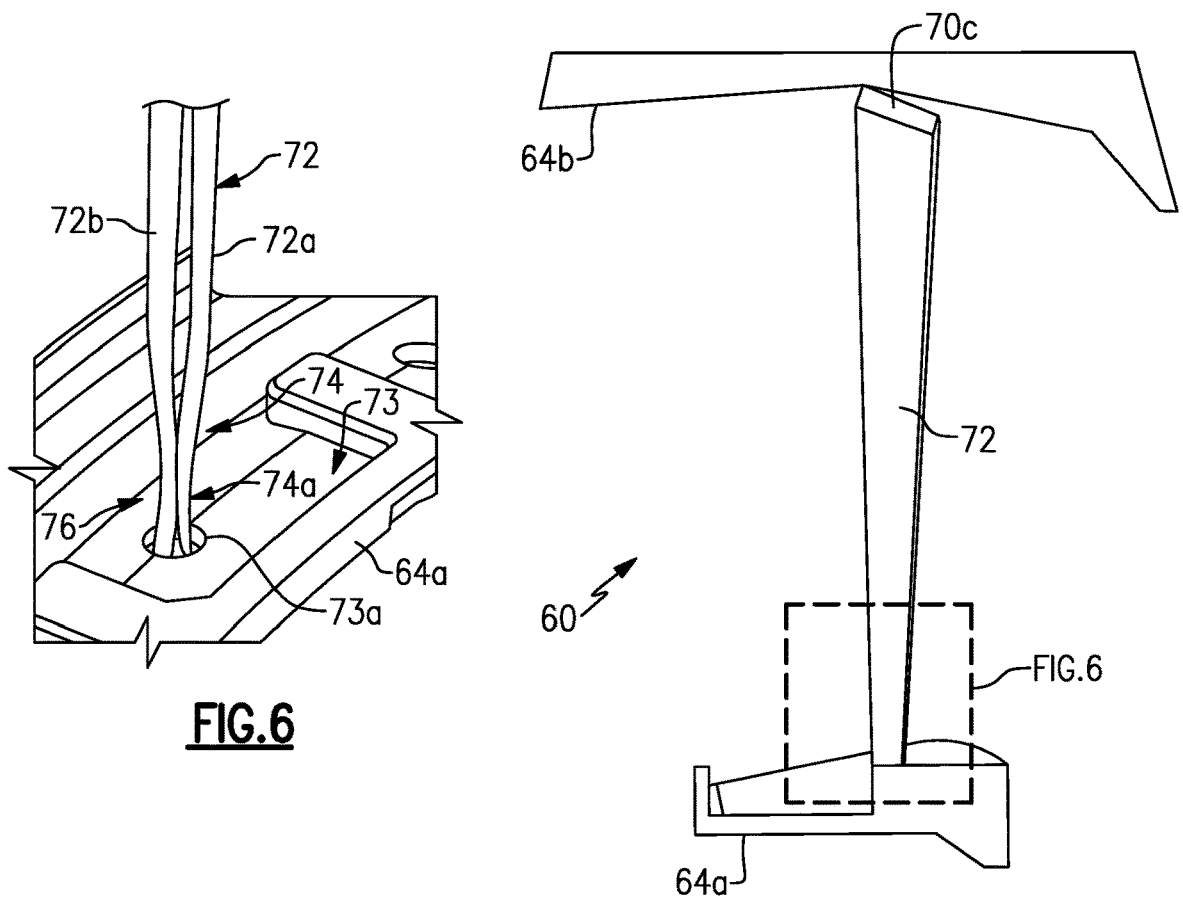
FIG.6
FIG.5

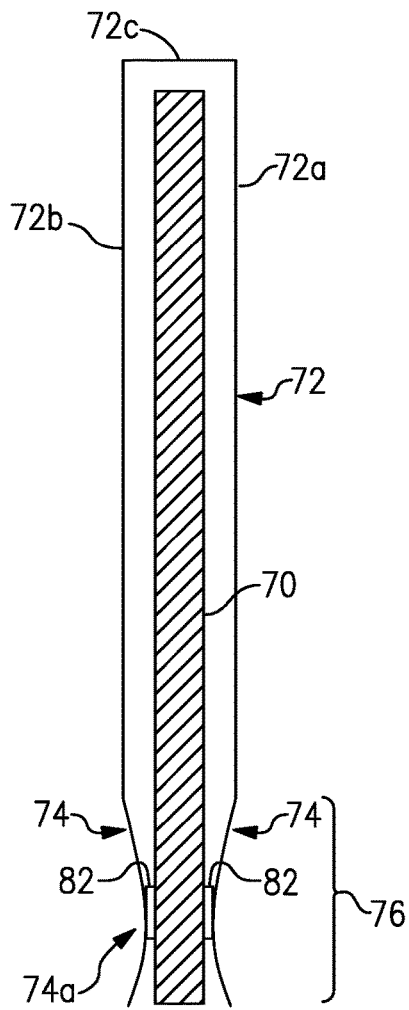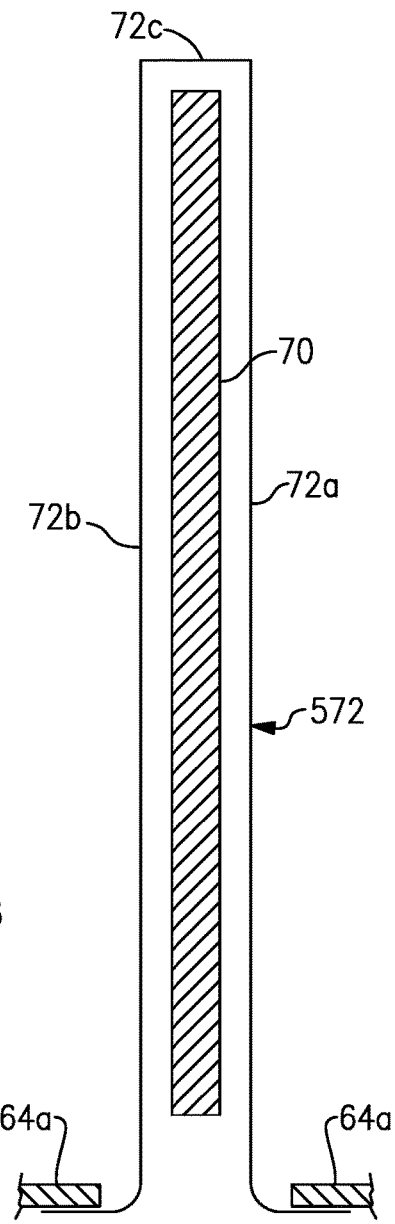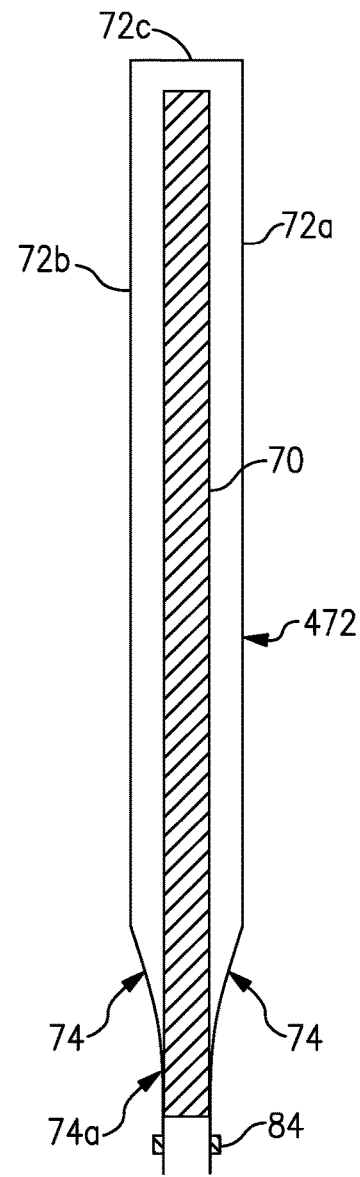

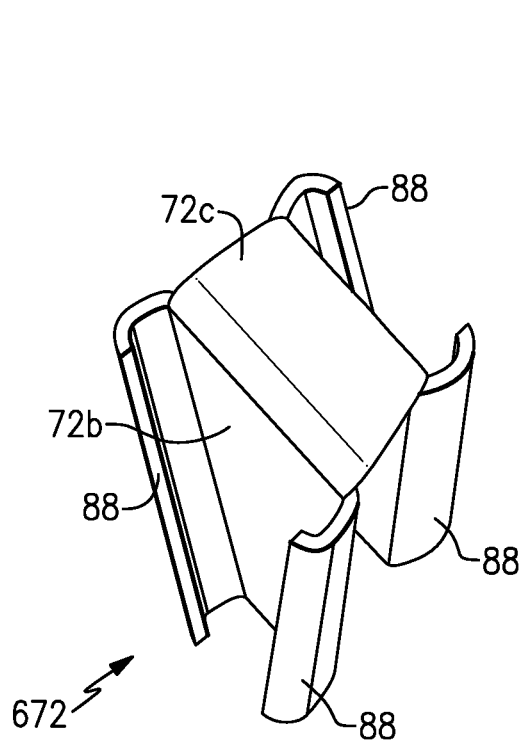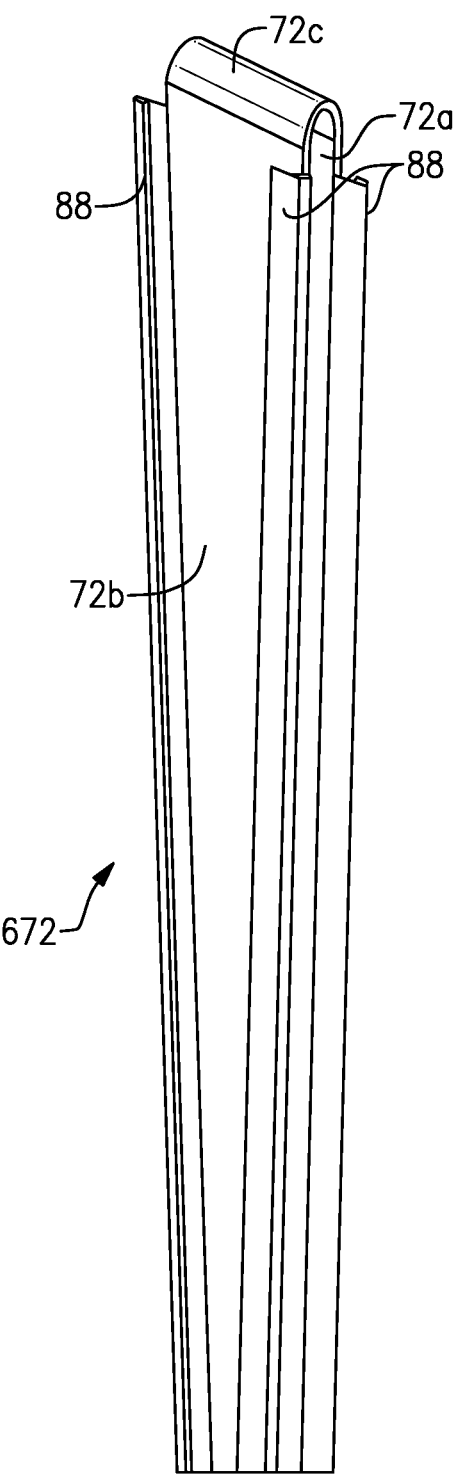
FIG.14
FIG.13

AIRFOIL WITH METALLIC SHIELD

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other attractive properties, CMCs have high temperature resistance and oxidation resistance. Despite these attributes, however, there are unique challenges to implementing CMCs in airfoils.

SUMMARY

A gas turbine engine article according to an example of the present disclosure includes a wall and a rib that are formed of a ceramic matrix composite. The wall circumscribes an internal cavity for receiving cooling air. The rib connects opposed first and second sides of the wall. A shield is disposed in the internal cavity and at least partially enclosing the rib to shield the rib from the cooling air.

In a further embodiment of any of the foregoing embodiments, the rib has a forward side, an aft side, and an end edge, and the shield at least partially encloses the forward side, the aft side, and the end edge.

In a further embodiment of any of the foregoing embodiments, the shield fully encloses the forward side, the aft side, and the end edge.

In a further embodiment of any of the foregoing embodiments, the shield includes a spring clip that pinches onto the rib, securing the shield to the rib.

A further embodiment of any of the foregoing embodiment includes a contact pad between the spring clip and the rib.

In a further embodiment of any of the foregoing embodiments, there is a continuous gap between the rib and the shield.

In a further embodiment of any of the foregoing embodiments, the rib extends over a radial span, and the shield substantially fully extends the radial span.

In a further embodiment of any of the foregoing embodiments, the rib extends over a radial span, and the shield extends less than 90% of the radial span.

In a further embodiment of any of the foregoing embodiments, the shield includes a spacer tab that spaces the shield from the first side of the wall.

In a further embodiment of any of the foregoing embodiments, the shield includes first and second spaced-apart legs and a bridge portion that connects the first and second spaced-apart legs.

In a further embodiment of any of the foregoing embodiments, the spaced-apart legs include portions that converge toward each other.

In a further embodiment of any of the foregoing embodiments, the shield is secured to the rib.

In a further embodiment of any of the foregoing embodiments, the shield includes a spring lever.

In a further embodiment of any of the foregoing embodiments, the shield includes a baffle portion having a baffle wall that circumscribes an open central region.

A gas turbine engine airfoil component according to an example of the present disclosure includes an airfoil section that has an airfoil wall and a rib that are formed of a ceramic matrix composite. The airfoil wall circumscribes an internal cavity that receives a flow of cooling air. The airfoil wall defines leading and trailing ends and first and second sides joining the leading and trailing ends. The rib connects the first and second sides. A shield is disposed in the internal cavity and at least partially blocks the flow of cooling air from impinging on the rib.

In a further embodiment of any of the foregoing embodiments, the rib has a forward side, an aft side, and an end edge, and the shield encloses the forward side, the aft side, and the end edge.

In a further embodiment of any of the foregoing embodiments, the shield includes a spring clip that pinches onto the rib, securing the shield to the rib, and the shield does not contact the rib except at the spring clip.

In a further embodiment of any of the foregoing embodiments, the airfoil section defines a radial span, the rib substantially fully extends the radial span, and the shield substantially fully extends the radial span.

In a further embodiment of any of the foregoing embodiments, the rib defines a thickness span, and the shield substantially fully extends the thickness span.

In a further embodiment of any of the foregoing embodiments, the shield includes first and second spaced-apart legs and a bridge portion connecting the first and second spaced-apart legs.

A method of assembling a gas turbine engine article according to an example of the present disclosure includes providing an article that has a wall and a rib that are formed of a ceramic matrix composite. The wall circumscribes an internal cavity for receiving cooling air, and the rib connects opposed first and second sides of the wall. A shield is installed into the internal cavity such that the shield at least partially encloses the rib to shield the rib from the cooling air.

In a further embodiment of any of the foregoing embodiments, the installing includes securing the shield to the rib.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2B illustrates a radial view of the article of FIG. 2A.

FIG. 5 illustrates selected portions of the article to demonstrate how a shield may be retained.

FIG. 6 illustrates a shield received into a pocket and holes in the pocket for retention.

FIG. 9 illustrates contact pad between a shield and a rib of the article.

FIG. 11 illustrates a shield that has a lock ring.

FIG. 12 illustrates a shield that is attached to a structure other than the rib.

FIG. 13 illustrates selected portions of an article to demonstrate another example of a shield.

FIG. 14 is a radial view of an article and shield of FIG. 13.

DETAILED DESCRIPTION

Figure 1:
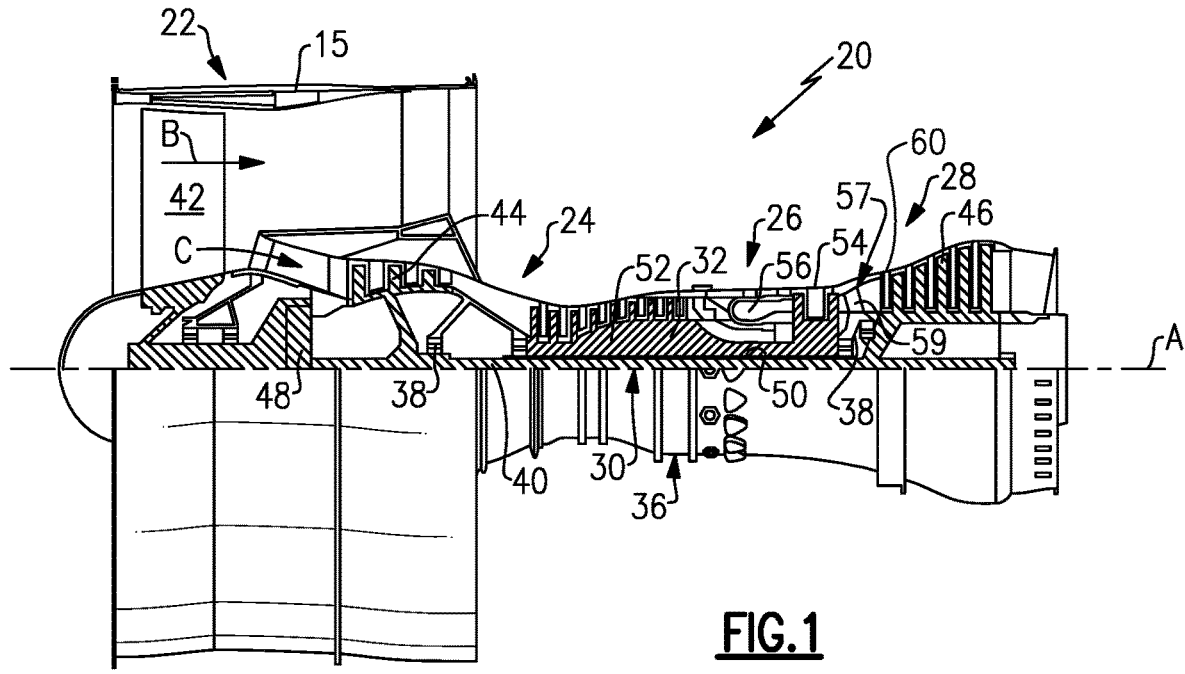
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2A:
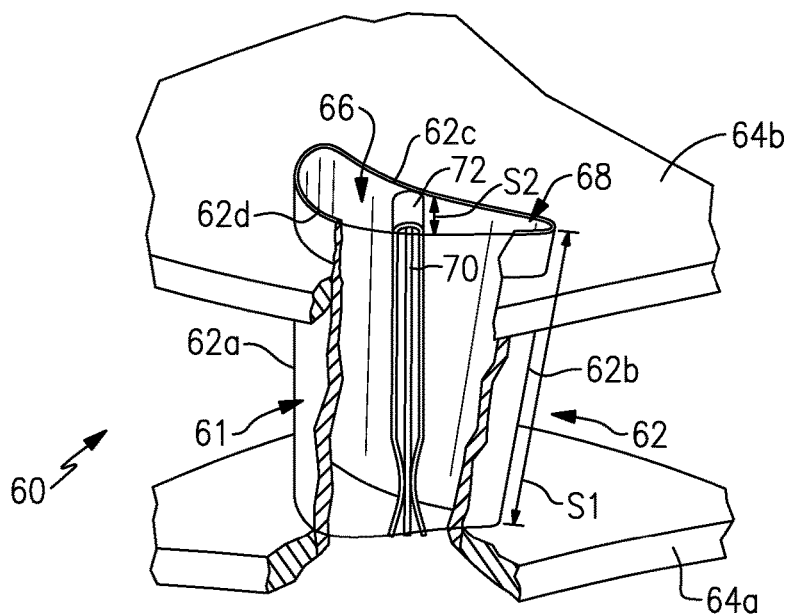
FIG. 2A illustrates an article of the gas turbine engine.

FIG. 2A illustrates a representative cutaway view of an example of an article 60 used in the turbine engine 20 (see also FIG. 1), and FIG. 2B illustrates a radial view of the article 60. As shown, the article 60 is an airfoil turbine vane; however, it is to be understood that, although the examples herein may be described and shown with reference to turbine vanes, this disclosure is also applicable to cooled blades and blade outer air seals where a the presence of an internal rib is required.

In this example, the article 60 includes an airfoil section 61 that is defined by an (outer) airfoil wall 62 that delimits an aerodynamic profile. In this regard, the wall 62 defines a leading end 62a, a trailing end 62b, and first and second sides 62c/62d that join the leading end 62a and the trailing end 62b. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa. In this example, the first side 62c is a pressure side and the second side 62d is a suction side. The airfoil wall 62 generally extends in a radial direction relative to the central engine axis A. For a vane, the airfoil wall 62 spans from a first or inner structure 64a to a second or outer structure 64b. The terms "inner" and "outer" refer to location with respect to the central engine axis A, i.e., radially inner or radially outer. For a blade, the airfoil wall 62 would extend from a single inner structure to a free end. The inner and outer structures 64a/64b may include platforms that bound the core gas path, as well as inner and outer sub-structures that support the platforms.

The airfoil wall 62 circumscribes an internal cavity 66 for receiving cooling air, such as bleed air from the compressor section 24. The cooling air may be provided through a port or ports in one or both of the structures 64a/64b. In the illustrated example, the outer structure 64b includes a port 68 through which the cooling air is provided into the cavity 66.

The article 60 further includes at least one rib 70 that connects the opposed first and second sides 62c/62d of the airfoil wall 62. It is to be appreciated that in other types of articles 60, such as blade outer air seals, the wall 62 will have a different geometry. In the example of an airfoil, the rib 70 is generally radially elongated between the structures 64a/64b such that it spans the full or substantially full radial distance of the airfoil wall 62. The term substantially full refers to at least 90% of the radial span between the structures 64a/64b. The rib 70 structurally ties the sides 62c/62d together to thereby reinforce the sides 64a/64 against loading from internal static pressure in the cavity 66.

At least the airfoil wall 62 and the rib 70 are formed of a ceramic matrix composite ("CMC"). As an example, the CMC is a silicon-containing ceramic. The silicon-containing ceramic may be, but is not limited to, silicon carbide (SiC) or silicon nitride ($Si_3N_4$). In a further example, the CMC is SiC/SiC in which SiC fibers are disposed within a SiC matrix. As used herein, "formed of" refers to the structural self-supporting body of the wall 62, rib 70, or other structure, rather than a conformal body such as a coating.

In a metallic article, heat may be readily conducted from external surfaces of the adjacent hot walls to internal ribs. Even though the ribs will be actively cooled on both surfaces by cooling air, the higher strength and ductility of traditional superalloys allows for this large temperature gradient from the rib to the internal surface of the hot wall to not affect durability of the component. Components formed from CMCs, however, have significantly lower thermal conductivity than superalloys and do not possess the same strength and ductility, making them more susceptible to distress from thermal gradients and the thermally induced stresses those form. For instance, although a CMC wall is exposed to the high temperatures in the core gas path, a CMC rib may be at a substantially lower temperature (e.g., at least >200° F. lower) due to the low thermal conductivity of the CMC. This, in turn, may generate high thermal gradients between the wall and the rib resulting in relatively large thermally induced stresses in the rib. Therefore, while it may be permissible to cool metallic ribs or structures, the inventors herein recognized that cooling of a CMC rib may exacerbate thermal gradients above the CMC capability and thus be counter-productive to meeting durability goals. In this regard, as will discussed in additional detail below, the article 60 includes a shield 72 disposed in the cavity 66. The shield 72 at least partially encloses the rib 70 to shield the rib 70 or portions of the rib 70 from the cooling air. The uncooled rib 70 or uncooled portions of the rib 70 can thereby be maintained at lower thermal gradient levels relative to the airfoil wall 62.

Figure 3:
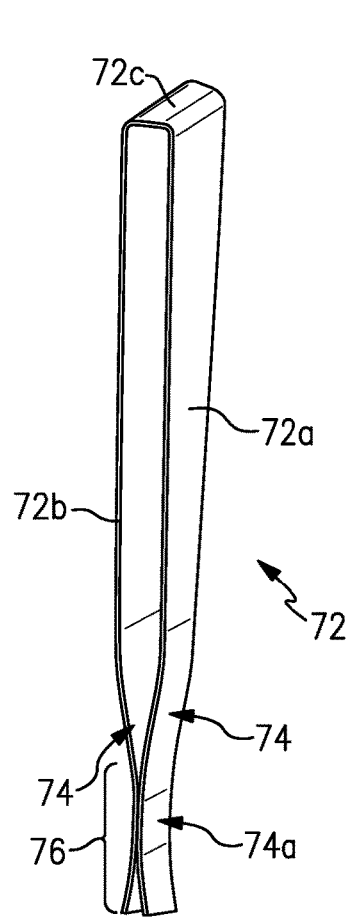
FIG. 3 illustrates an isolated view of a shield of the article.

An example of the shield 72 is shown in an isolated view in FIG. 3. The shield 72 is formed of a metallic material, a ceramic material, or a composite material. Example metallic materials include, but are not limited to, nickel- or cobalt-based superalloys. Example ceramic materials include monolithic ceramics or ceramic matrix composites. The ceramic material may include, but is not limited to, silicon-containing ceramics. The silicon-containing ceramic may be, but is not limited to, silicon carbide (SiC) or silicon nitride ($Si_3N_4$), and the CMC described above.

In this example, the shield 72 includes first and second spaced-apart legs 72a/72b and a bridge portion 72c that connects the legs 72a/72b. The legs 72a/72b include respective portions 74 that converge toward each other to form a pinch point 74a. The legs 72a/72b and bridge 72c may provide a spring such that the converging end portions 74 and pinch point 74a together form a spring clip 76.

Figure 4:
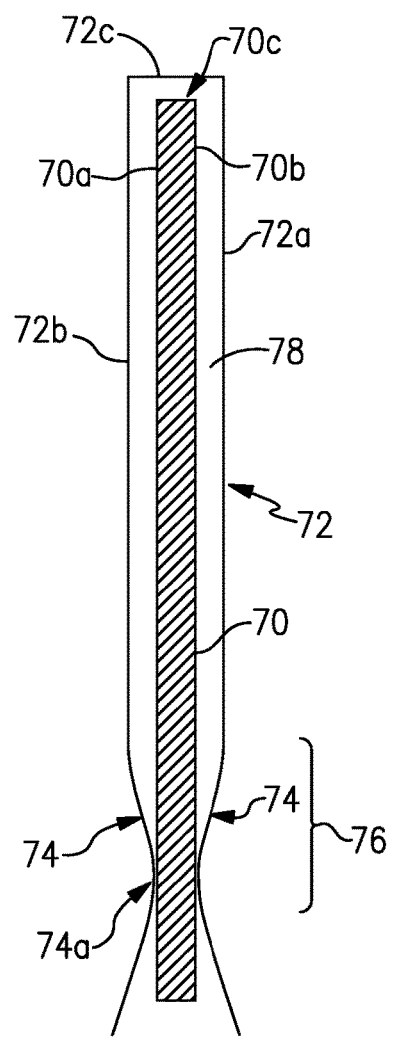
FIG. 4 illustrates a shield attached with a rib of the article.

FIG. 4 illustrates the shield 72 secured on the rib 70. The rib 70 includes a forward side 70a, an aft side 70b, and an end edge 70c. The forward side 70a is oriented to face toward the leading end 62a of the article 60 (for an airfoil) and the aft side 70b is oriented to face toward the trailing end 62b. In this example, the end edge 70c is located near the mouth of the port 68. The shield 72 at least partially encloses the forward side 70a, the aft side 70b, and the end edge 70c. For instance, in this example, the shield 72 fully encloses the forward side 70a, the aft side 70b, and the end edge 70c.

The spring clip 76 pinches onto the rib 70 to secure the shield 72 to the rib 70. For instance, in the illustrated example, the spring force provided by the legs 72a/72b and bridge 72c bias the converging portions 74 toward each other such that the portions 74 pinch onto the rib 70 at the pinch point 74a.

In the secured position shown, there is a gap 78 between the rib 70 and the metallic shield 72. For example, the gap 78 is continuous from the pinch point 74a at the forward side 70a of the rib 70, along the forward side 70a, around the end edge 70c, and along the aft side 70b. Thus, the shield 72 only contacts the rib 70 at the pinch point 74a, thereby facilitating reduction in thermal conductance between the shield 72 and the rib 70.

The shield 72 may be further retained in place by the structures 64a/64b. For instance, FIG. 5 illustrates the article 60, but without the airfoil section 61 and platform portions of the structures 64a/64b so that the retention can be observed. In FIG. 5 only inner and outer sub-structure portions of the structures 64a/64b are shown. In this example, the second or outer structure 64b caps the end edge 70c, thus limiting radially-outward movement of the shield 72. As shown in FIG. 6, the first or inner structure 64a includes a pocket 73 that receives the radially inner end of the shield 72. In this example, the pocket 73 includes a hole 73a that captures the ends of the legs 72a/72b to further retain the shield 72. For example, the hole 73a pinches the ends of the legs 72a/72b together to facilitate pinching the shield 72 onto the rib 70.

As indicated above, the shield 72 in this example fully encloses the rib 70. For instance, the airfoil section 61 defines a radial span S1 (FIG. 2) from the inner structure 64a to the outer structure 62b. The rib 70 and shield 72 substantially fully extend the radial span. That is, the shield 72 also substantially fully extends the radial span of the rib 70, as shown in FIG. 4. The rib 70 also defines a thickness span S2 (FIG. 2) from the first side 62c of the airfoil wall 62 to the second side 62d of the airfoil wall 62. The shield 72 substantially fully extends the thickness span. The shield 72 substantially fully encloses the rib 70 by covering the end edge 70c of the rib 70 and the sides 70a/70b of the rib 70 over the radial and thickness spans of the rib 70. The shield 72 thus completely blocks the flow of cooling air that enters from the port 68 from making direct contact with the rib 70 and providing forced convection from the bulk flow in the internal cavity.

Figure 7:
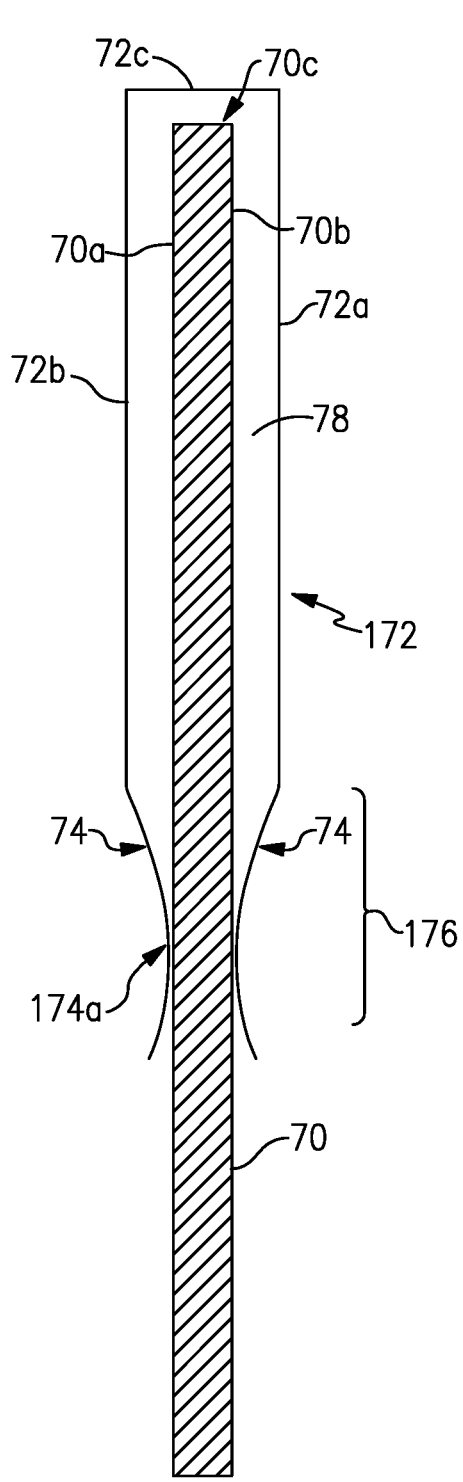
FIG. 7 illustrates another example of a shield that attaches to an intermediate location of the rib of the article and leaves a portion of the rib exposed.

It is to be further appreciated that a shield according to the present disclosure may alternatively only partially enclose a rib. For instance, FIG. 7 illustrates another example metallic shield 172. In this disclosure, like reference numerals designate like elements where appropriate and reference numerals with the addition of one-hundred or multiples thereof designate modified elements that are understood to incorporate the same features and benefits of the corresponding elements. In this example, the shield 172 is radially shorter than the shield 72 such that the spring clip 176 and pinch point 174a are at a radially intermediate location of the rib 70. Only a portion of the rib 70 is enclosed in the shield 172, while another portion of the rib 70 is non-enclosed and thus directly exposed to the flow of cooling air. For example, the shield 172 extends less than 90%, less than 70%, or less than 50% of the radial span of the rib 70, leaving more than 10%, more than 30%, or more than 50%, respectively, of the radial span of the rib 70 exposed.

Such partial enclosure of the rib 70 may be used to shield portions of the rib 70 that have potential for higher thermal gradients, but leave other portions of the rib 70 exposed where there are lower thermal gradients and less need for shielding. For instance, the cooling air may be at its lowest temperature (highest cooling capacity) when first entering the cavity 66 from the port 68. The initial extent of the rib 70 adjacent the port 68 may be enclosed in the shield 172 to block this low temperature cooling air from making contact on the initial extent of the rib 70. However, as the cooling air travels from the port 68 through the cavity 66 toward the structure 64a it absorbs thermal energy from the walls 62 and increases in temperature. Therefore, there may be less of a need to shield the portion of the rib 70 distal from the port 68.

Figure 8:
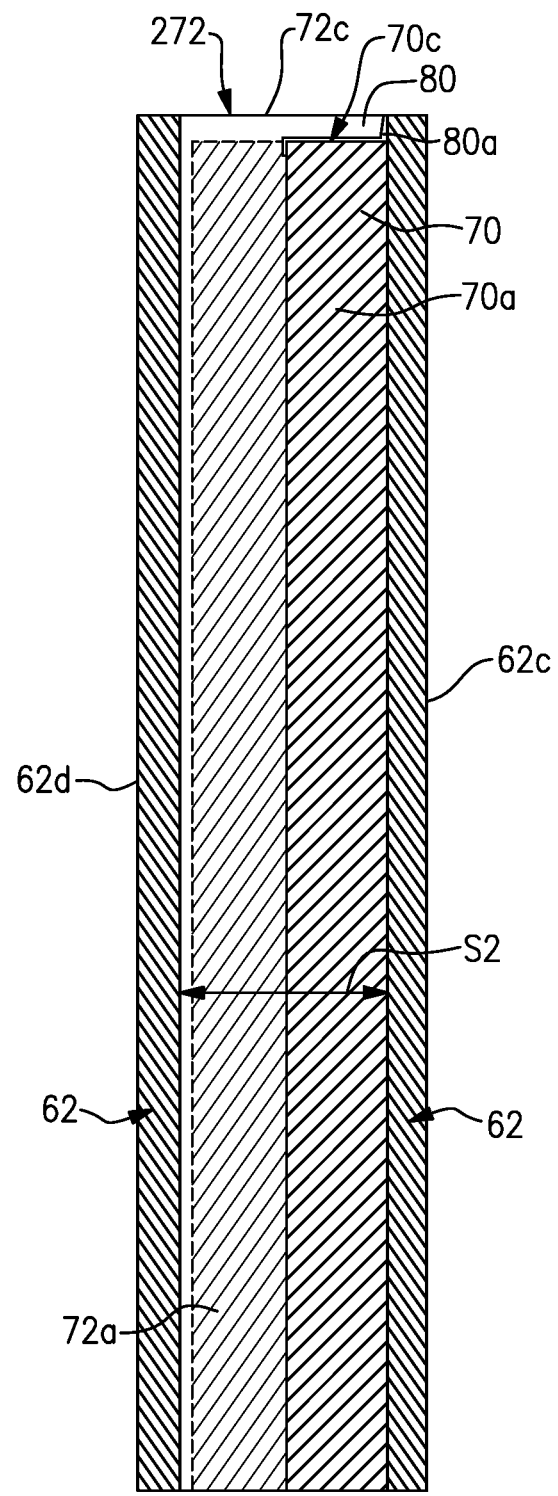
FIG. 8 illustrates another example of a shield that has a spacer tab.

Similarly, a shield may only partially enclose the thickness span of a rib. For instance, FIG. 8 illustrates another example shield 272 shown along an axial view. In this example, the shield 272 is shorter in the thickness direction (e.g., direction perpendicular to the camber line of the airfoil section 61) such that a portion of the rib 70 adjacent the pressure or suction side is enclosed in the shield 272, while the opposed portion of the rib 70 adjacent the suction or pressure side is non-enclosed and thus directly exposed to the flow of cooling air.

Again, such partial enclosure of the rib 70 may be used to shield portions of the rib 70 that have potential for higher thermal gradients, but leave other portions of the rib 70 exposed where there are lower thermal gradients and less need for shielding. For instance, the thermal gradient may be higher at one or the other of the sides 62c/62d of the airfoil wall 62, in which the shield 272 encloses the portion of the rib 70 adjacent that side 62c or 62d. In this instance, some cooling air may flow by convection, rather than direct impingement, from the non-enclosed portion of the rib 70 into the gap between the shield 272 and the rib 70 in the enclosed portion. It is to be further appreciated from the examples that the radial and thickness extent of a shield may be tailored in accordance with cooling air temperature, cooling air flow, and thermal gradients.

To facilitate spacing the shield 272 from the first side 62c or the second side 62d the shield 272 includes a spacer tab 80. In this example, the spacer tab 80 projects from an intermediate portion of the shield 272 in a direction that is substantially orthogonal to the elongated direction of the legs 72a/72b (e.g., the radial direction). For instance, the spacer tab 80 includes a free tip 80a that abuts one of the sides 62c/62d. The spacer tab 80 thus serves as a locator to prevent the metallic shield 272 from shifting between the sides 62c/62d. Although one spacer tab 80 is shown, it is to be understood that the metallic shield 272 may include one or more additional spacer tabs, which may project from the bridge portion 72c or legs 72a/72b. It is to be further appreciated that the above examples are non-limiting and that additional variations of partial enclosures are within the scope of this disclosure, including shield configurations that block flow to only one side of the rib 70 or only a section of one side of the rib 70. For instance, the shield blocks at least 50% of the surface area of at least one side of the rib 70.

As indicated above, the spring clip 76/176 may contact the rib 70 at the pinch point 74a/174a. In a further example shown in FIG. 9, there is a contact pad or pads 82 between the pinch point 74a (or 174a) of the spring clip 76 (or 176) and the rib 70. For instance, the contact pad or pads 82 may facilitate reduction in wear and/or reduction in thermal conductance between the shield 72 (or 172 or 272) and the rib 70. For example, the contact pad 82 may be a coating on either the shield 72 or rib 70 or an initially separate pad piece that is then bonded to either the shield 72 or rib 70. As examples, the contact pad 82 is composed of, but not limited to, cobalt based superalloys, or compatible (non-reactive under the operating conditions) monolithic ceramics such as silicon carbide or silicon nitride.

Figure 10:
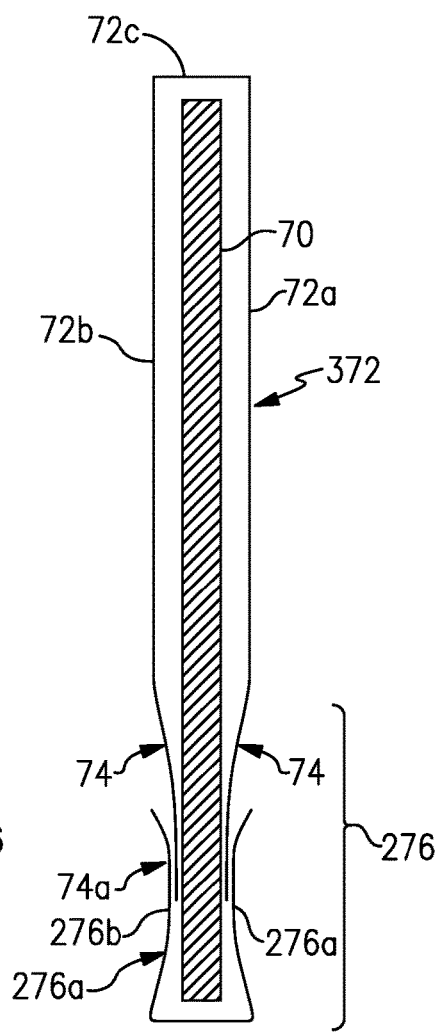
FIG. 10 illustrates a spring clip that has a separate clip portion.

It is to be further appreciated that alternate securement configurations may be used to attach a shield to a rib. For example, FIG. 10 illustrates another example shield 372 and spring clip 276. In this example, the spring slip 276 includes a clip portion 276a that is a separate, distinct piece from the legs 72a/72b of the shield 372. The clip portion 276a includes spring arms 276b/276c that clamp onto the converging portions 74 of the legs 72a/72b to secure the metallic shield 372 on the rib 70. Some or all of the clip portion 276a may also be integrated into other structure, such as the structure 64a.

FIG. 11 illustrates another example shield 472. In this example, a lock ring 84 is received around the end of the metallic shield 472. The lock ring 84 compresses the legs 72a/72b toward each other, thereby clamping the converging portions 74 of the legs 72a/72b onto the rib 70.

FIG. 12 illustrates another example shield 572. In this example, rather than the converging portions 74, the legs 72a/72b are elongated to extend beyond the rib 70. For instance, the legs 72a/72b may extend into the structure 64a or beyond the structure 64a. The ends of the legs 72a/72b are bonded, such as by welding, to the structure 64a. The structure 64a may be the aforementioned platform or substructure. In this example, the metallic shield 572 does not contact the rib 70.

FIGS. 13 and 14 illustrate another example shield 672. In this example, the shield 672 includes one or more spring levers 88. As illustrated, there are four spring levers 88, projecting from the edges of the legs 72a/72b. The spring levers 88 have an arcuate shape and are flexible to facilitate a spring action when installed against the sides 62c/62d of the wall 62. For instance, when the shield 672 is installed around the rib 70 the spring levers 88 abut the sides 62c/62d and flex under the force of installation. The sides 62c/62d prevent the spring levers 88 from fully rebounding. The spring force causes the spring levers 88 to continue to press against the sides 62c/62d, thereby helping to retain the shield 672 in place. The spring levers 88 extend the full length of the legs 72a/72b. In a modified example, however, the spring levers 88 may extend only a partial length of the legs 72a/72b.

Figure 15:
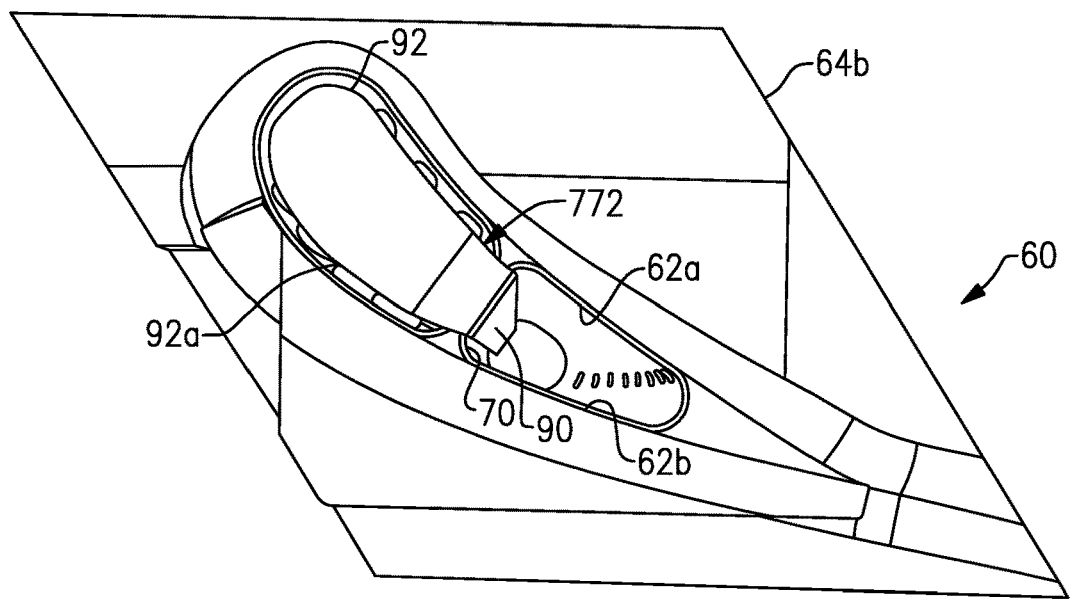
FIGS. 15 and 16 are, respectively, radially inner and outer views of an article and shield that includes a baffle portion.
Figure 16:
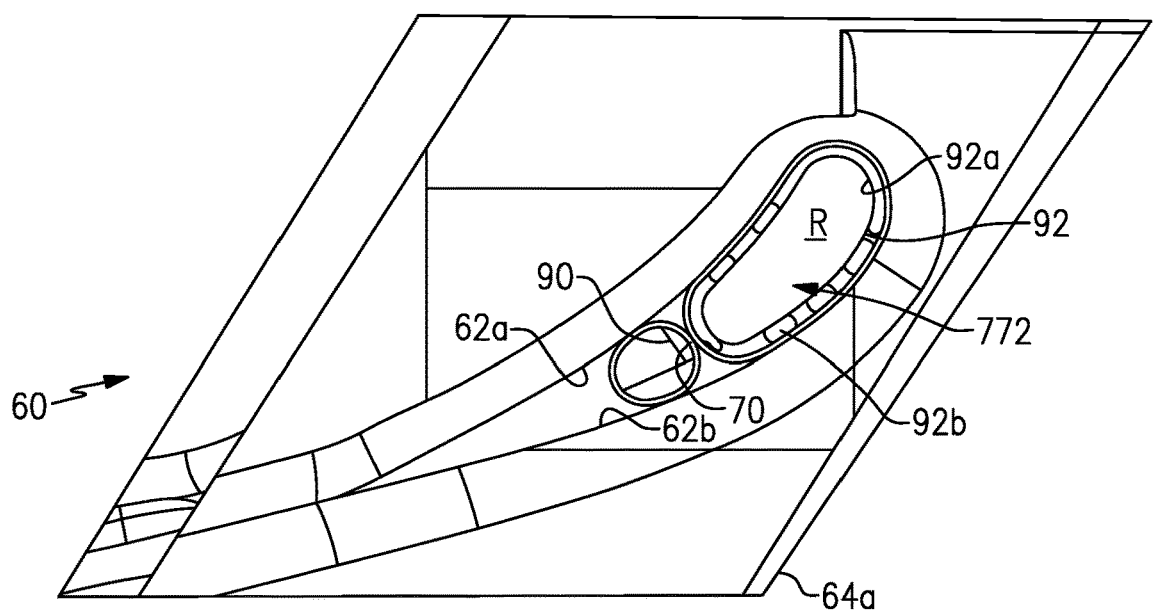
Figure 17:
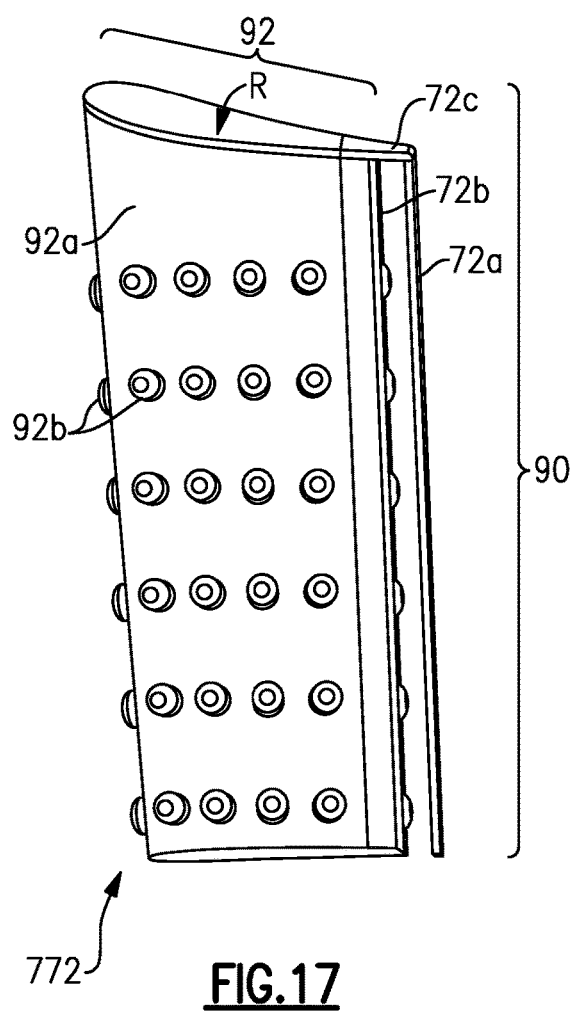
FIG. 17 is an isolated, representative view of the shield of FIGS. 15 and 16.

FIGS. 15 and 16 illustrate, respectively, a radially inward view and a radially outward view of another example shield 772, and FIG. 17 illustrates an isolated, representative sectioned view of the shield 772. In this example, the shield 772 includes a shield portion 90 and a baffle portion 92. The shield portion 90 may have the configuration of the aforementioned examples. Here, however, the aft face of the baffle portion 92 serves as the leg 72b of the shield 772. The baffle portion 92 projects off of the bridge portion 72c of the shield portion 90. The baffle portion 92 may be comprised of a baffle wall 92a that circumscribes an open central region R. The baffle wall 92a may include one or more stand-offs 92b that serve to seat the baffle portion 92 in the cavity 66. It is to be further appreciated from the example that, in place of or in addition to the baffle portion 92, any of the shields disclosed herein may be integrated with any number of structures in or adjacent to a rib, such as but not limited to, surrounding case or ring structures.

Figure 18:
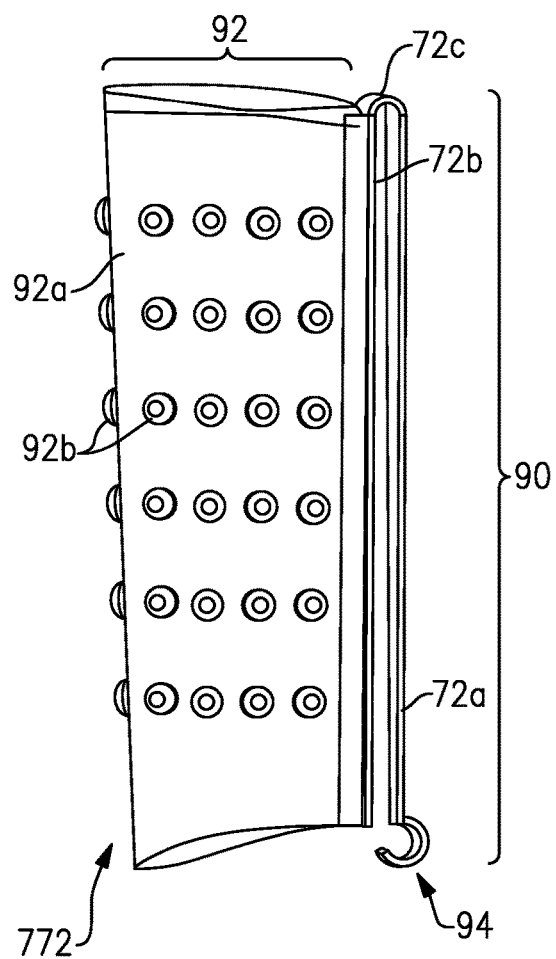
FIG. 18 is another example of a shield that includes a baffle portion, and a hook.

FIG. 18 illustrates a modified example of the shield 772. In this example, the leg 72a of the shield 772 includes an attachment feature 94 that facilitates securing the shield 772 in the cavity 66. The attachment feature 94 may be, but is not limited to, a hook as shown in the figure. The hook may engage a mating feature in the structure 64a.

If the shield disclosed herein is metallic, it may be fabricated by known metal-forming techniques, such as but not limited to bending and cutting of sheet metal, casting, forging, and/or additive manufacturing. Technique permitting, the shield may in some instances be formed with relatively thick walls such that the shield may also serve as a spar to provide structural support of the airfoil 60. As an example, the walls of the shield are approximately 0.3 millimeters thick. If the shield is formed of ceramic material, known ceramic processing techniques may be used for fabrication.

The examples above also demonstrate a method of assembling the article 60. For instance, the method includes installing a shield as disclosed herein into the internal cavity 66 such that the shield at least partially encloses the rib 70 to shield the rib 70 from the cooling air. The installation may be related to an original manufacture of the article 60 or to a repair or replacement procedure for the article 60. As an example the installation includes securing the shield to the rib. The securing may be direct, as for the disclosed spring clips, or indirect as for the welding to the structure 64a or the lock ring 84. Prior to, or in conjunction with, the securing, the shield may be installed into the cavity 66 to enclose or partially enclose the rib 70. For example, the shield is moved through the port 68 into position around the rib 70. If necessary, the legs 72a/72b of the shield may be moved part to permit the shield to be fitted over the rib 70. Additionally or alternatively, the ends of the legs 72a/72b beyond the converging portions 74 may diverge, as shown in FIG. 3. The divergent portions of the legs 72a/72b may then serve as a pilot to receive the rib 70 and guide the shield onto the rib 70 during installation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a wall and a rib that are formed of a ceramic matrix composite, the wall circumscribing an internal cavity for receiving cooling air, the rib connecting opposed first and second sides of the wall; and
   a shield disposed in the internal cavity and at least partially enclosing the rib to shield the rib from the cooling air, the shield including a spring clip that pinches onto the rib, securing the shield to the rib.

2. The article as recited in claim 1, wherein the rib has a forward side, an aft side, and an end edge, and the shield at least partially encloses the forward side, the aft side, and the end edge.

3. The article as recited in claim 2, wherein the shield fully encloses the forward side, the aft side, and the end edge.

4. The article as recited in claim 1, further comprising a contact pad between the spring clip and the rib.

5. The article as recited in claim 1, wherein there is a continuous gap between the rib and the shield.

6. The article as recited in claim 1, wherein the rib extends over a radial span, and the shield substantially fully extends the radial span.

7. The article as recited in claim 1, wherein the rib extends over a radial span, and the shield extends less than 90% of the radial span.

8. The article as recited in claim 1, wherein the shield includes a spacer tab that spaces the shield from the first side of the wall.

9. The article as recited in claim 1, wherein the shield includes first and second spaced-apart legs and a bridge portion that connects the first and second spaced-apart legs.

10. The article as recited in claim 9, wherein the spaced-apart legs include portions that converge toward each other.

11. The article as recited in claim 1, wherein the shield includes a spring lever.

12. The article as recited in claim 1, wherein the shield includes a baffle portion having a baffle wall that circumscribes an open central region.

13. A gas turbine engine airfoil component comprising:
    an airfoil section having an airfoil wall and a rib that are formed of a ceramic matrix composite, the airfoil wall circumscribing an internal cavity receiving a flow of cooling air, the airfoil wall defining leading and trailing ends and first and second sides joining the leading and trailing ends, the rib connecting the first and second sides, the airfoil section having radially inner and outer ends defining a radial span therebetween; and
    a shield disposed in the internal cavity and at least partially blocking the flow of cooling air from impinging on the rib, the rib and the shield substantially fully extending over the radial span, the shield including a spring clip that pinches onto the rib, securing the shield to the rib.

14. The airfoil as recited in claim 13, wherein the rib has a forward side, an aft side, and an end edge, and the shield encloses the forward side, the aft side, and the end edge.

15. The airfoil as recited in claim 13, wherein the shield does not contact the rib except at the spring clip.

16. The airfoil as recited in claim 13, wherein the airfoil section defines a radial span, the rib substantially fully extends the radial span, and the shield substantially fully extends the radial span.

17. The airfoil as recited in claim 13, wherein the rib defines a thickness span, and the shield substantially fully extends the thickness span.

18. The airfoil as recited in claim 13, wherein the shield includes first and second spaced-apart legs and a bridge portion connecting the first and second spaced-apart legs.

19. A method of assembling a gas turbine engine article, the method comprising:
   providing an article that has a wall and a rib that are formed of a ceramic matrix composite, the wall circumscribes an internal cavity for receiving cooling air, and the rib connects opposed first and second sides of the wall; and
   installing a shield into the internal cavity such that the shield at least partially encloses the rib to shield the rib from the cooling air, the shield including a spring clip that pinches onto the rib, securing the shield to the rib.

\* \* \* \* \*